(12) United States Patent
Morioka

(10) Patent No.: US 7,856,159 B2
(45) Date of Patent: Dec. 21, 2010

(54) OPTICAL ELEMENT, OPTICAL MODULE HOLDER INCLUDING OPTICAL ELEMENT, OPTICAL MODULE, AND OPTICAL CONNECTOR

(75) Inventor: Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/001,406

(22) Filed: Dec. 11, 2007

(65) Prior Publication Data

US 2008/0142815 A1 Jun. 19, 2008

(30) Foreign Application Priority Data

Dec. 15, 2006 (JP) .............................. 2006-337938

(51) Int. Cl.
*H01L 33/00* (2010.01)

(52) U.S. Cl. .............................. 385/33; 385/34; 385/92; 385/93; 385/88; 385/89; 385/94; 385/76; 385/77; 385/53

(58) Field of Classification Search .................... 385/93, 385/92, 88, 49, 91, 33, 34, 89, 94, 53, 76, 385/77; 257/81

See application file for complete search history.

(56) References Cited

U.S. PATENT DOCUMENTS

| 5,555,334 | A  | * | 9/1996 | Ohnishi et al. ................. 385/93 |
| 6,607,309 | B2 | * | 8/2003 | Kuhn et al. .................... 385/93 |
| 7,348,540 | B2 | * | 3/2008 | Mogi et al. ............. 250/227.11 |
| 2004/0190837 | A1 | * | 9/2004 | Morioka ....................... 385/93 |

FOREIGN PATENT DOCUMENTS

JP  2001-343559  12/2001

* cited by examiner

*Primary Examiner*—Brian M. Healy
*Assistant Examiner*—Peter Loxas
(74) *Attorney, Agent, or Firm*—William L. Androlia; H. Henry Koda

(57) ABSTRACT

An optical element including a transmitting surface section and at least one reflective surface section integrally formed on a main body of the optical element. The transmitting surface section refracts incident light emitted from a predetermined light-emitting position and transmits the light. The reflective surface section reflects the incident light emitted from the light-emitting position such that the light returns to a position differing from the light-emitting position. An optical axis of the transmitting surface section and an optical axis of the reflective surface section are out of alignment such as to be mutually parallel or mutually tilted.

9 Claims, 5 Drawing Sheets

OPTICAL ELEMENT, OPTICAL MODULE HOLDER INCLUDING OPTICAL ELEMENT, OPTICAL MODULE, AND OPTICAL CONNECTOR

BACKGROUND OF THE INVENTION

1. Field of the Invention

The present invention relates to an optical element, an optical module holder including the optical element, an optical module, and an optical connector. In particular, the present invention relates to an optical element, an optical module holder including the optical element, an optical module, and an optical connector that are suitable for forming an optical path system used to monitor light emitted from a light-emitting element.

2. Description of the Related Art

Use of an optical module including a light-emitting element, such as a vertical-cavity surface emitting laser (VCSEL), for reasons related to cost and stability is increasing in optical communication using optical fiber.

An optical module such as this couples light including communication information, emitted from a light-emitting element, with an end face of the optical fiber via a lens. As a result, the optical element is used to transmit communication information via the optical fiber.

Among optical modules, an optical module is used in which a light-receiving element, in addition to the light-emitting element, is included within a package (CAN package) to support bi-directional communication. The light-receiving element receives light including communication information that has been carried via the optical fiber and emitted from the end face of the optical fiber.

Light output characteristics of the light-emitting element used in an optical module such as this change due to effects caused by temperature and the like. To stabilize output characteristics, the light (particularly the amount of light) emitted from the light-emitting element is preferably monitored.

Technologies described in Patent Literature 1 and Patent Literature 2, for example, have been known as conventional technology related to a light-emitting element including a specific structure used to acquire light for monitoring from the light-emitting element.

In other words, a following invention is disclosed in Patent Literature 1. In the invention, a mirror is disposed between an optical fiber and a surface emitting laser. A portion of light-emission output from the surface emitting laser is reflected to a light-receiving element side. The light receiving element receives the reflected light. As a result, the light-emission output from the light-reflecting element is monitored.

A following invention is disclosed in Patent Literature 2. A portion of light emitted from a light-emitting element and transmitted within an optical fiber is reflected by a semitransparent mirror to a light-receiving element side. The light-receiving element receives the reflected light. As a result, the light-emission output from the light-reflecting element is monitored. The semitransparent mirror may be configured by a filter composed of, for example, a dielectric multilayer. In this case, the semitransparent layer is separate from the lens.

In addition, for example, in an optical module 1 shown in FIG. 9, a CAN-package type photoelectric conversion element 4 is attached to a photoelectric conversion element attaching section 3 of an optical module holder 2. The photoelectric conversion element 4 includes a surface emitting laser 5, a monitoring detector 6, and a glass window 7. The surface emitting laser 5 serves as a light-emitting element. The monitoring detector 6 serves as a light-receiving element. The glass window 7 is at an angle to a center axis of light emitted form the surface emitting laser 5. In an optical module 1 such as this, a portion of light emitted from the surface emitting laser 5 is reflected by the glass window 7. The monitor detector 6 receives the reflected light. As a result, the light emitted from the surface emitting laser 5 can be monitored.

[Patent Literature 1] U.S. Pat. No. 6,607,309
[Patent Literature 2] Japanese Patent Laid-open Publication No. 2001-343559

However, the above-described conventional technologies have problems such as those described below.

In other words, in the conventional technologies disclosed in Patent Literature 1 and Patent Literature 2, the mirror or the semitransparent mirror disposed between a light transmission line and a light-emitting element is separate from the lens. Therefore, manufacturing procedures during assembly and the like may become complicated. Cost may increase because of the increase in the number of components. Furthermore, optical characteristics may deteriorate when a highly precise positioning of the mirror and the lens cannot be performed during assembly.

When the semitransparent mirror configured by the filter composed of the dielectric multilayer is used, increases in the complexity of the manufacturing procedures and in cost are expected because of a film-forming procedure.

It is thought that the above-described CAN-package type photoelectric conversion element including the glass window 7 has difficulty supporting high-speed optical communication of 10 Gbps or more. This is because crosstalk sometimes occurs in a CAN-package type photoelectric conversion element 4 such as this during high-frequency drive, as a result of electromagnetic waves leaking from a wiring section connected to the photoelectric conversion element.

Therefore, no effective proposal currently exist for easily and inexpensively manufacturing an optical element having superior optical characteristics and capable of supporting high-speed communication with a small number of components.

SUMMARY OF THE INVENTION

The present invention has been achieved in light of the above-described problems. An object of the invention is to provide an optical element, an optical module holder including the optical element, an optical module, and an optical connector that can support high-speed communication, achieve reductions in the number of components and cost, and enhance optical characteristics and manufacturability.

In order to achieve the aforementioned object, an optical element according to a first aspect of the present invention includes a transmitting surface section and at least one reflective surface section. The transmitting surface section refracts incident light emitted from a predetermined light-emitting position and transmits the light. The reflective surface section reflects the incident light emitted from the light-emitting position such that the light returns to a position differing from the light-emitting position. An optical axis of the transmitting surface section and an optical axis of the reflective surface section are out of alignment such as to be mutually parallel or mutually tilted.

In the first aspect of the invention, the light reflected by the reflective surface section to a position differing from the light-emitting position can be used to monitor light emitted from the light-emitting section without an element separate from the optical element used to monitor the light emitted from the light-emitting position being provided and even when a substrate-mounted light element that can support high-speed communication is used in place of a CAN-package type photoelectric conversion element including a glass window. As a result, an optical element that has superior optical characteristics and can support high-speed communication can be manufactured easily and inexpensively with a small number of components.

An optical element according to a second aspect is the optical element according to the first aspect, wherein the transmitting surface section and the reflective surface section are each formed on an entrance surface of a main body of the optical element for the light emitted from the light-emitting position.

In the second aspect of the invention, the reflective surface section can be formed on the entrance surface near the light-emitting position. As a result, a more preferable reflective light can be acquired for monitoring the light emitted from the light-emitting position. A more stable optical communication can be realized.

An optical element according to a third aspect is the optical element according to the second aspect, wherein the transmitting surface section is formed in a center area of the entrance surface and the reflective surface section is formed in a peripheral area of the entrance surface.

In the third aspect of the invention, the transmitting surface section is formed in the center area and the reflective surface section is formed in the peripheral area of the entrance surface. Therefore, a wide range over which excellent coupling efficiency is achieved can be acquired when the optical element is used for coupling light with the optical transmission line. As a result, an allowance for assembly error can be increased.

An optical element according to a fourth aspect is the optical element according to the first aspect, wherein a plurality of reflective surface sections are formed and optical axes of the plurality of reflective surface sections are out of alignment such as to be mutually parallel or mutually tilted.

In the fourth aspect of the invention, a plurality of reflective surfaces are formed. As a result, a more preferable reflective light for monitoring can be acquired. A more stable optical communication can be realized.

An optical element according to a fifth aspect is the optical element according to first aspect, wherein the transmitting surface section is formed as an aspheric surface that transmits the incident light and concentrates the light. The reflective surface section is formed as an aspheric surface that reflects the incident light and concentrates the light.

In the fifth aspect of the invention, the light for monitoring can be appropriately concentrated by the reflective surface section that is an aspheric surface. The light emitted from the light-emitting position can be for appropriately monitored.

An optical element according to a sixth aspect is the optical element according to any one of the first to fifth aspects, wherein the transmitting surface section and the reflective surface section are integrally formed from a same resin material.

In the sixth aspect of the invention, the transmitting surface section and the reflective surface section can be integrally formed using inexpensive resin material. As a result, manufacturing costs and manufacturing procedures can be further reduced.

An optical module holder according to a seventh aspect includes an optical element according to claim 1, a light element attaching section, and an optical transmission line attaching section. The light element attaching section is formed on the light-emitting position side of the optical element and is capable of being attached to a light element including a light-emitting element and a light-receiving element. The optical transmission line attaching section is formed on a side opposite of the light-emitting position of the optical element and is capable of being attached to an end face of an optical transmission line. The optical element, the light element attaching section, and the optical transmission line attaching section are integrally formed by resin material.

In the seventh aspect of the invention, an optical element that has superior optical characteristics and can support high-speed communication can be manufactured easily and inexpensively with a small number of components.

An optical module according to an eighth aspect includes an optical module holder according to claim 7, and a light element including a light-emitting element and a light-receiving element.

In the eighth aspect of the invention, an optical module can be realized of which the optical element that has superior optical characteristics and can support high-speed communication can be manufactured easily and inexpensively with a small number of components.

An optical connector according to a ninth aspect includes an optical module according to claim 8, and a housing that houses the optical module.

In the ninth aspect of the invention, an optical connector can be realized of which the optical element that has superior optical characteristics and can support high-speed communication can be manufactured easily and inexpensively with a small number of components.

EFFECT OF THE INVENTION

In the invention, the invention is to provide an optical element, an optical module holder including the optical element, an optical module, and an optical connector that can support high-speed communication can be supported, reductions in the number of components and cost can be achieved, and enhance optical characteristics and manufacturability can be enhanced.

DETAILED DESCRIPTION OF THE PREFERRED EMBODIMENT

First Embodiment

An optical element, an optical module holder including the optical element, an optical module, and an optical connector according to a first embodiment of the present invention will be described with reference to FIG. 1 to FIG. 4

Figure 1:
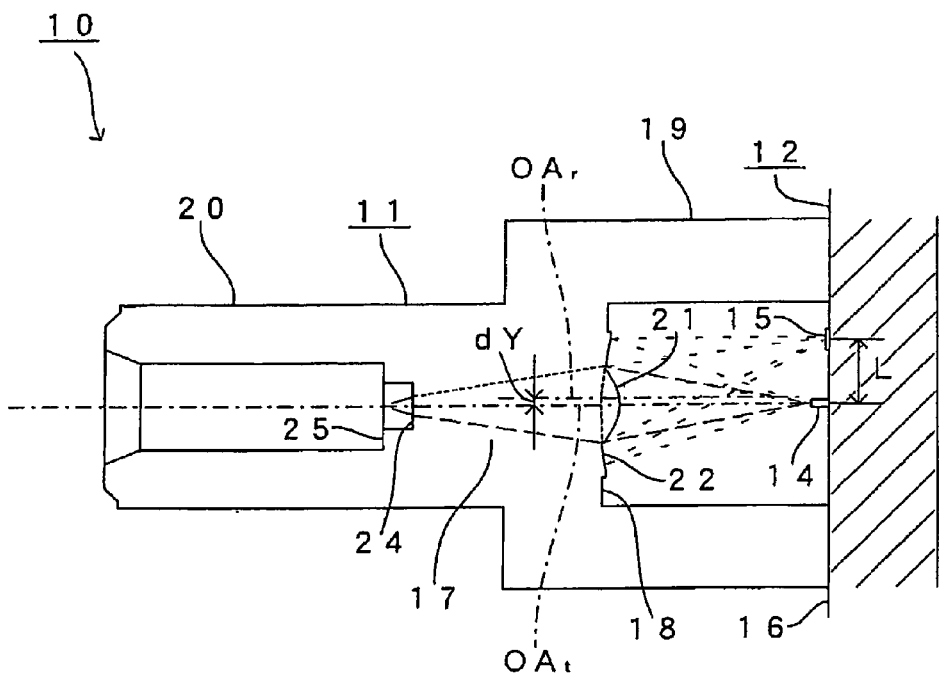
FIG. 1 is a schematic diagram of an optical module according to a first embodiment of an optical element, an optical module holder including the optical element, an optical module, and an optical connector of the present invention.

FIG. 1 shows an optical module including an optical element according to the first embodiment of the invention. An optical module 10 according to the embodiment includes an optical module holder 11 and a substrate-mounted photoelectric conversion element 12. The photoelectric conversion element 12 is attached to one end (the right end in FIG. 1) of the optical module holder 11 and serves as a light element.

The photoelectric conversion element 12 includes a surface emitting laser 14 and a monitoring detector 15 that are mounted on a substrate 16. The surface emitting laser 14 serves as a light-emitting element. The monitoring detector 15 serves as a light-receiving element that receives light (referred to, herein after, as monitor light) used to monitor light emitted by the surface emitting laser 14. The substrate 16 includes a semiconductor.

The optical module holder 11 includes a disc-shaped optical element 17, a cylindrical photoelectric conversion element attaching section 19, and a cylindrical optical fiber attaching section 20. The optical element 17 has a predetermined thickness. The photoelectric conversion element attaching section 19 serves as a light element attaching section formed on the photoelectric conversion element 12 (light-emitting position) side of the optical element 17. The optical fiber attaching section 20 serves as an optical transmission line attaching section formed on the side opposite of the photoelectric conversion element 12 of the optical element 12.

The optical module holder 11 is, for example, formed by injection-molding using a resin material composed of light-transmitting plastic, such as polyetherimide (PEI), polycarbonate (PC), and polymethylmethacrylate (PMMA).

Figure 2:
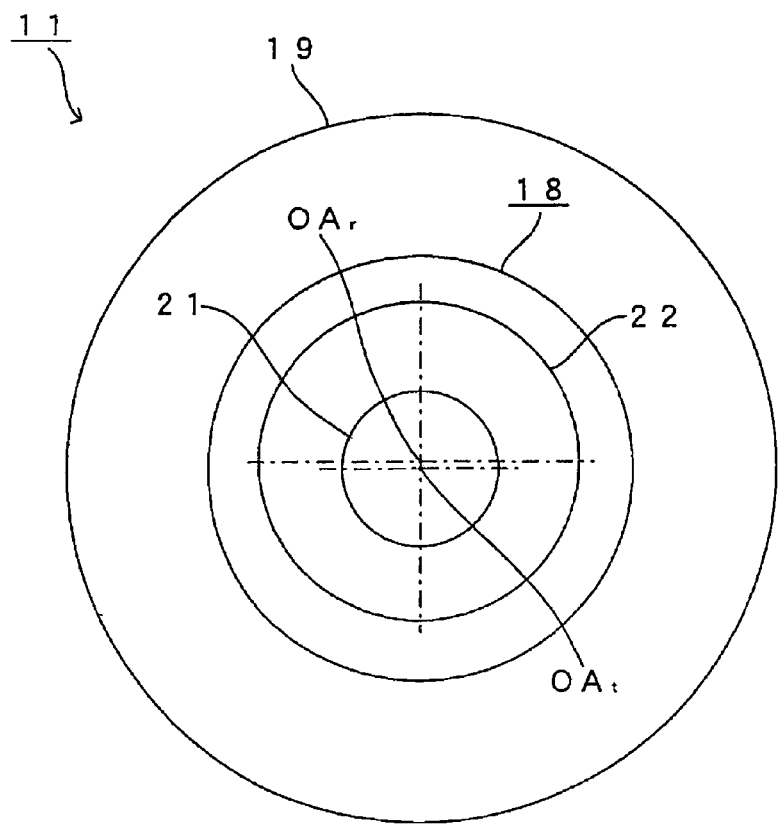
FIG. 2 is a diagram of the optical module according to the first embodiment of the optical element, the optical module holder including the optical element, the optical module, and the optical connector of the present invention, viewed from a photoelectric conversion element side in an optical axis direction.

As shown in FIG. 1 and FIG. 2, a flat, circular entrance surface 18 is formed on an end face of the optical element 17 on the photoelectric conversion element 12 side. The light emitted form the surface emitting laser 14 enters the entrance surface 18.

A flat, circular transmitting surface section 21 is formed in a center area of the entrance surface 18 in the radial direction. The transmitting surface section 21 is a lens surface of which the convex surface faces the photoelectric conversion element 12 side. An optical axis $OA_t$ of the transmitting surface section 21 is aligned with the center axis of the light emitted from the surface emitting laser 14.

The transmitting surface section 21 refracts the light emitted from the surface emitting laser 14 and incident on the transmitting surface section 21 and transmits the light. As a result, the light entering the transmitting surface section 21 is concentrated on the end face (the left end face in FIG. 1) of the optical element 17 on the optical fiber side. The transmitting surface section 21 can be an aspheric surface.

Furthermore, a reflective surface section 22 is formed in the peripheral area of the entrance surface 18 in the radial direction. The reflective surface section 22 is formed from a portion (periphery) of the lens surface of which a virtual concave surface, indicated by a broken line in FIG. 1, faces the photoelectric conversion element 12 side. The reflective surface section 22 is connected to the transmitting surface section 21 such as to envelop the transmitting surface section 21.

An optical axis $OA_r$ of the reflective surface section 22, or in other words, a surface normal passing though a virtual surface peak of the reflective surface section 22 is out of alignment with the optical axis $OA_t$ of the transmitting surface section 21 in the radial direction (the longitudinal direction in FIG. 1), in parallel with the optical axis $OA_r$.

The reflective surface section 22 reflects the light emitted from the surface emitting laser 14 and incident on the reflective surface section 22. As a result, the light entering the reflective surface section 22 is concentrated onto the monitoring detector 15 in the photoelectric conversion element 12.

As a result, even when the substrate-mounted photoelectric conversion element 12 to which the conventional glass window 7 cannot be provided is used, the monitoring detector 15 can receive the monitor light using light reflection by the reflective surface 22. When the glass window 7 is used, the monitor light reflected by the glass window 7 becomes divergent. On the other hand, the monitor light reflected by the reflective surface section 22 is converged. Therefore, according to the embodiment, a more preferable monitor light can be acquired for monitoring with high accuracy the amount of light emitted from the surface emitting laser 14.

The reflective surface section 22 is formed on the entrance surface 18 near the surface emitting laser 14 (light-emitting position). Therefore, a more preferable monitor light can be acquired for monitoring the light emitted from the surface emitting laser 14. A more stable optical communication can be realized.

Furthermore, the reflective surface section 22 is formed in the peripheral area of the entrance surface 18. Therefore, a wide range over which excellent coupling efficiency between the light emitted from the surface emitting laser 14 and the optical fiber is achieved can be acquired. As a result, an allowance for assembly error can be increased.

According to the embodiment, the reflective surface section 22 is structured to be a reflective surface using Fresnel reflection of the lens surface (concave surface). As a variation example of the reflective surface section 22, a reflective surface having a reflective structure composed of a microstructure can be used. The microstructure is a group of minute concave and convex forms. When a reflective surface section 22 using the Fresnel reflection or a reflective surface section 22 formed from the microstructure, such as those above, is used, the transmitting surface section 21 and the reflective surface section 22 can be formed at a low cost, only requiring integral formation using a resin material. In the reflective surface section 22, the lens surface can be coated by a material (such as Al, Ag, or Cr) having favorable reflectance, as required. However, in this case, a coating procedure is required in addition to the integral formation procedure for the resin material.

Figure 3:
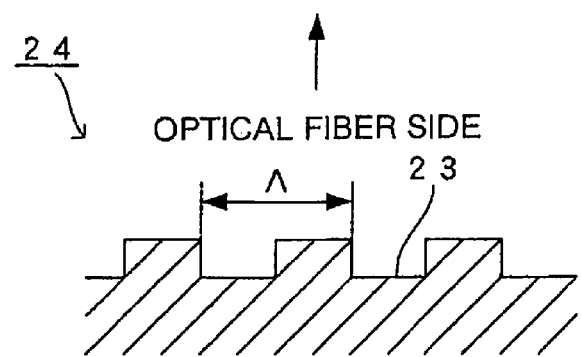
FIG. 3 is a cross-sectional diagram of a diffraction grating formed in an optical element according to the first embodiment of the optical element, the optical module holder including the optical element, the optical module, and the optical connector of the present invention.

As an example according to the embodiment, the center of the end face of the optical element 17 on the optical fiber side is an exit surface. The light that has passed through the transmitting surface section 21 is emitted from the optical element 17 through the exit surface. A diffraction grating 24 composed of a plurality of grating grooves 23 is formed on the exit surface, as shown in FIG. 3.

An interval Λ (an interval at which the grating grooves 23 are formed) of the diffraction grating 24 is formed such as to be smaller than the wavelength of the light to be used. As a result, the diffraction grating 24 can attenuate the amount (transmittance) of light emitted from the optical element 17 to an amount of light depending on an angle of the direction of the grating grooves 23 to the direction of the light (linearly polarized light) incident on the diffraction grating 24 from the transmitting surface section 21 side.

The periphery of the end of the optical element 17 on the optical fiber side extends further to the optical fiber side than the center of the end face of the optical element on the optical fiber side, such as to form a level difference with the center. The periphery serves as a contact surface 25 with which a ferrule 31, described hereafter, comes into contact.

Figure 4:
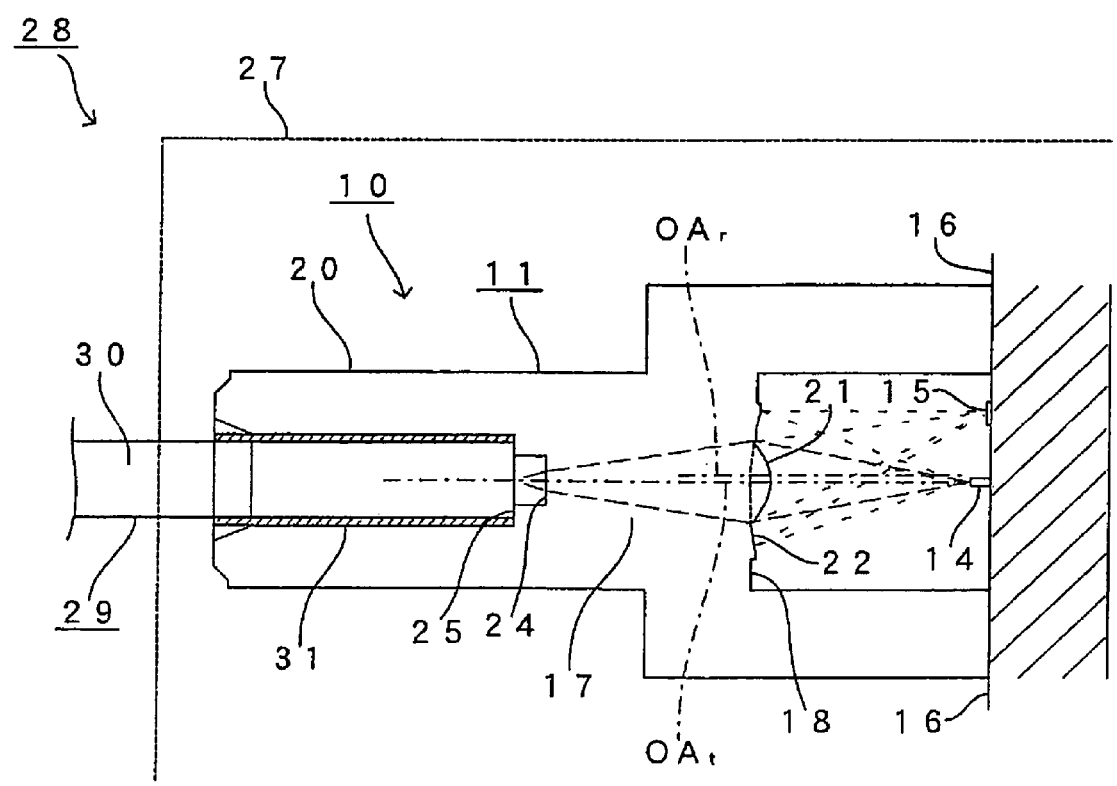
FIG. 4 is a schematic diagram of an optical connector according to the first embodiment of the optical element, the optical module holder including the optical element, the optical module, and the optical connector of the present invention.

The optical module 10 according to the embodiment, configured as described above, is housed within a housing 27, as shown in FIG. 4, thereby forming an optical connector 28.

An end of an optical fiber 29, in addition to the ferrule 31, is attached to the optical fiber attaching section 20 in an optical fiber 28 such as this. The ferrule 31 holds a fiber core 30. When the optical fiber 29 is attached, the end face of the ferrule 31 comes into contact with the contact surface 25 of the optical element 17.

Example

Next, an example of the optical element 17 according to the first embodiment will be described.

According to the embodiment, r denotes the radius curvature (mm) of an optical surface. d denotes a distance (mm) to the next optical surface. n denotes the index of refraction of light of which the wavelength λ=850 nm (light to be used). Furthermore, dY (see FIG. 1) denotes an amount of misalignment (axis misalignment length) between the optical axis $OA_t$ of the transmitting surface section 21 and the optical axis $OA_r$ of the reflective surface section 22. L (see FIG. 1) denotes a distance between the surface emitting laser 14 and the monitoring detector 15 in the photoelectric conversion element 12.

k, A, B, C, and D denote each coefficient in a following expression (6). Specifically, the shape of the aspherical surfaces of the transmitting surface section 21 and the reflective surface section 22 is expressed by the following expression provided that the direction of the optical axis is taken as the Z axis, the direction orthogonal to the optical axis (height direction) is taken as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}] + AX^4 + BX^6 + CX^8 + DX^{10}$$

In the following example, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 6.4E-2 denotes $6.4 \times 10^{-2}$.

The optical element 17 of the example is set under the following conditions.

| (Transmitting surface section) Diameter = 0.55 mm, dY = 0.20 mm, and L = 0.40 mm | | | |
|---|---|---|---|
| Face Number | r | d | n |
| 1(Emitting Surface of Surface Emitting Laser) | 0.00000 | 1.7500 | 1.00 |
| 2(Surface Peak of Transmitting Surface Section) | 0.61075 | 2.9500 | 1.64 |
| 3(Exit Surface of Optical Element) | 0.00000 | 0.3000 | |
| 4(Ferrule Contact Surface of Optical Element) | 0.00000 | | 1.00 |

| Face Number | k | A | B | C | D |
|---|---|---|---|---|---|
| 2(Surface Peak of Transmitting Surface Section) | −1.412955 | 6.404890E−2 | 7.771608E−3 | −2.413507E−3 | 1.958257E−1 |

| (Reflective Surface Section) | | | |
|---|---|---|---|
| Face Number | r | d | n |
| 1(Emitting Surface of Surface Emitting Laser) | 0.00000 | 2.0800 | 1.00 |
| 2(Surface Peak of Transmitting Surface Section) | −1.6765 | −2.0800 | −1.00 |
| 3(Monitoring Detector) | 0.0000 | | 1.00 |

-continued

| Face Number | k | A | B | C | D |
|---|---|---|---|---|---|
| 2(Surface Peak of Transmitting Surface Section) | 6.086561E-1 | 1.615209E-1 | 5.663365E-2 | -1.384397E-1 | 0.00 |

In the optical element 17 of the example configured as described above, the light emitted from the surface emitting laser 14 and incident on the transmitting surface section 21 can be appropriately coupled with the end face of the optical fiber after the light is transmitted by the transmitting surface section 21 and emitted from the exit surface. At this time, the light emitted from the surface emitting laser 14 and incident on the reflective surface section 22 can be reflected by the reflective surface section 22 as the monitor light. The light can be concentrated on the monitoring detector 15. As a result, a stable communication accompanying the monitoring of the light emitted from the surface emitting laser 14 can be performed.

Second Embodiment

Next, an optical element, an optical module holder including the optical element, an optical module, and an optical connector according to a second embodiment of the present invention will be described with reference to FIG. 5.

Figure 5:
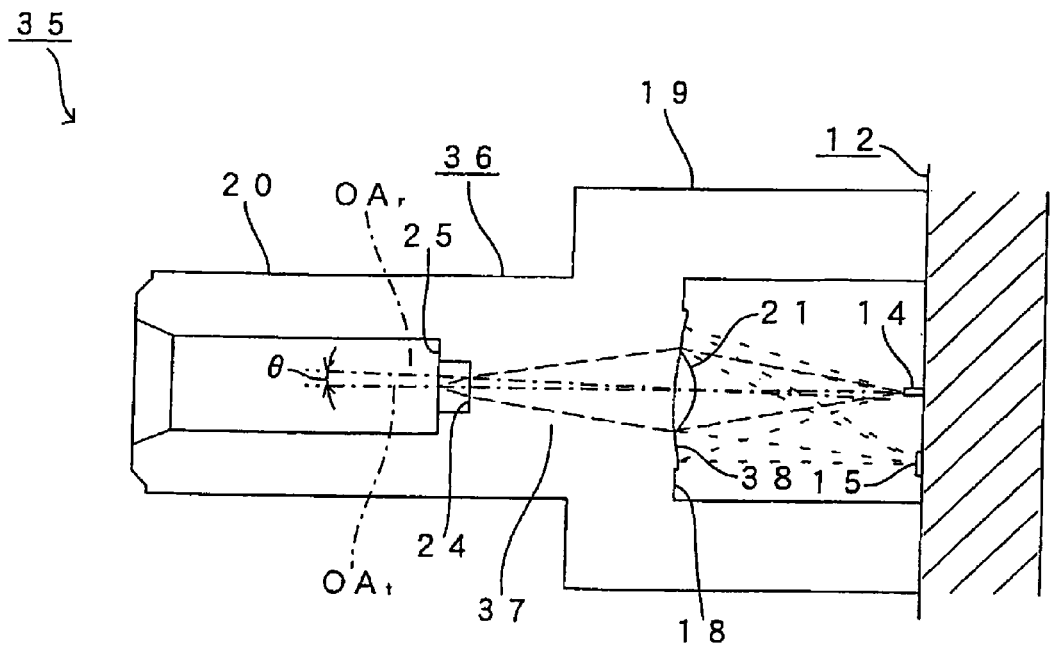
FIG. 5 is a schematic diagram of an optical module according to a second embodiment of an optical element, an optical module holder including the optical element, an optical module, and an optical connector of the present invention.

As shown in FIG. 5, an optical module 35 according to the embodiment includes an optical module holder 36 and a substrate-mounted photoelectric conversion element 12, as does the first embodiment. The optical module holder 36 is formed by an optical element 37, the photoelectric conversion element holder 19, and the optical fiber attaching section 20 being integrally formed using resin material.

Furthermore, the transmitting surface section 21 and a reflective surface section 38 are formed on the entrance surface 18 of the optical element 37. The transmitting surface section 21 is a convex lens surface. The reflective surface section 38 is a portion of a concave lens surface surrounding the transmitting surface section 21.

However, according to the embodiment, relative positions of the optical axis $OA_t$ of the transmitting surface section 21 and the optical surface $OA_r$ of the reflective surface section 38 differ from that according to the first embodiment.

In other words, according to the embodiment, the optical surface $OA_r$ of the reflective surface section 38 is out of alignment with the optical axis $OA_t$ of the transmitting surface section 21 such as to be tilted (such as to have a tilt angle). The optical surface $OA_r$ of the reflective surface section 38 is also tilted from the center axis of the light emitted from the surface emitting laser 14 at the same angle as from the optical axis $OA_t$ of the transmitting surface section 21.

The reflective surface section 38, formed as described above, reflects the light emitted from the surface emitting laser 14 and incident on the reflective surface section 38, as according to the first embodiment. As a result, the light incident on the reflective surface section 38 can be concentrated on the monitoring detector 15 in the photoelectric conversion element 12.

Therefore, according to this embodiment as well, as according to the first embodiment, even when the substrate-mounted photoelectric conversion element 12 on which the glass window 7 cannot be provided is used, the monitoring detector 15 can receive the monitor light using light reflection by the reflective surface section 38.

As according to the first embodiment, the reflective surface section 38 is structured to be a reflective surface using Fresnel reflection. As a variation example of the reflective surface section 38, a reflective surface having a reflective structure composed of a microstructure can be used. The microstructure is a group of minute concave and convex forms. Alternatively, a reflective surface coated by a material (such as Al, Ag, or Cr) having favorable reflectance can be used.

Furthermore, as according to the first embodiment, the optical connector can be formed by the optical module holder 36 according to the embodiment being housed within the housing 27.

Next, an example of the optical element 37 according to the second embodiment will be described.

According to the embodiment, r denotes the radius curvature (mm) of an optical surface. d denotes a distance (mm) to the next optical surface. n denotes the index of refraction of light of which the wavelength $\lambda=850$ nm (light to be used). $\theta$ denotes an angle (tilt angle) formed by the optical axis $OA_t$ of the transmitting surface section 21 and the optical axis $OA_r$ of the reflective surface section 38 (see FIG. 5). L denotes a distance between the surface emitting laser 14 and the monitoring detector 15 in the photoelectric conversion element 12.

Furthermore, as according to the first embodiment, k denotes a constant of cone in an aspherical expression. A denotes a 4th order aspherical coefficient, B denotes a 6th order aspherical coefficient, C denotes an 8th order aspherical coefficient, and D denotes a 10th order aspherical coefficient in the aspherical expression.

Still further, in the example, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 6.4E-2 denotes $6.4 \times 10^{-2}$.

The optical element 37 of the example is set under the following conditions.

(Transmitting surface section)
Diameter = 0.55 mm, θ = 7.3058°, and L = 0.40 mm

| Face Number | r | d | n |
|---|---|---|---|
| 1(Emitting Surface of Surface Emitting Laser) | 0.00000 | 1.7500 | 1.00 |
| 2(Surface Peak of Transmitting Surface Section) | 0.61075 | 2.9500 | 1.64 |
| 3(Exit Surface of Optical Element) | 0.00000 | 0.3000 | |
| 4(Ferrule Contact Surface of Optical Element) | 0.00000 | | 1.00 |

| Face Number | k | A | B | C | D |
|---|---|---|---|---|---|
| 2(Surface Peak of Transmitting Surface Section) | −1.412955 | 6.404890E−2 | 7.771608E−3 | −2.413507E−3 | 1.958257E−1 |

(Reflective Surface Section)

| Face Number | r | d | n |
|---|---|---|---|
| 1(Emitting Surface of Surface Emitting Laser) | 0.000 | 1.560 | 1.00 |
| 2(Surface Peak of Transmitting Surface Section) | −1.590 | −1.560 | −1.00 |
| 3(Monitoring Detector) | 0.000 | | 1.00 |

| Face Number | k | A | B | C | D |
|---|---|---|---|---|---|
| 2(Surface Peak of Transmitting Surface Section) | 2.460925 | 1.143512E−1 | −2.477720E−1 | 8.591791E−1 | 0.00 |

In the optical element 37 of the example, configured as described above, the light emitted from the surface emitting laser 14 and incident on the transmitting surface section 21 can be appropriately coupled with the end face of the optical fiber after the light is transmitted by the transmitting surface section 21 and emitted from the exit surface. At this time, the light emitted from the surface emitting laser 14 and incident on the reflective surface section 38 can be reflected by the reflective surface section 38 as the monitor light. The light can be concentrated on the monitoring detector 15. As a result, a stable communication accompanying the monitoring of the light emitted from the surface emitting laser 14 can be performed.

Third Embodiment

Next, an optical element, an optical module holder including the optical element, an optical module, and an optical connector according to a third embodiment of the present invention will be described with reference to FIG. 6 to FIG. 8.

Figure 6:
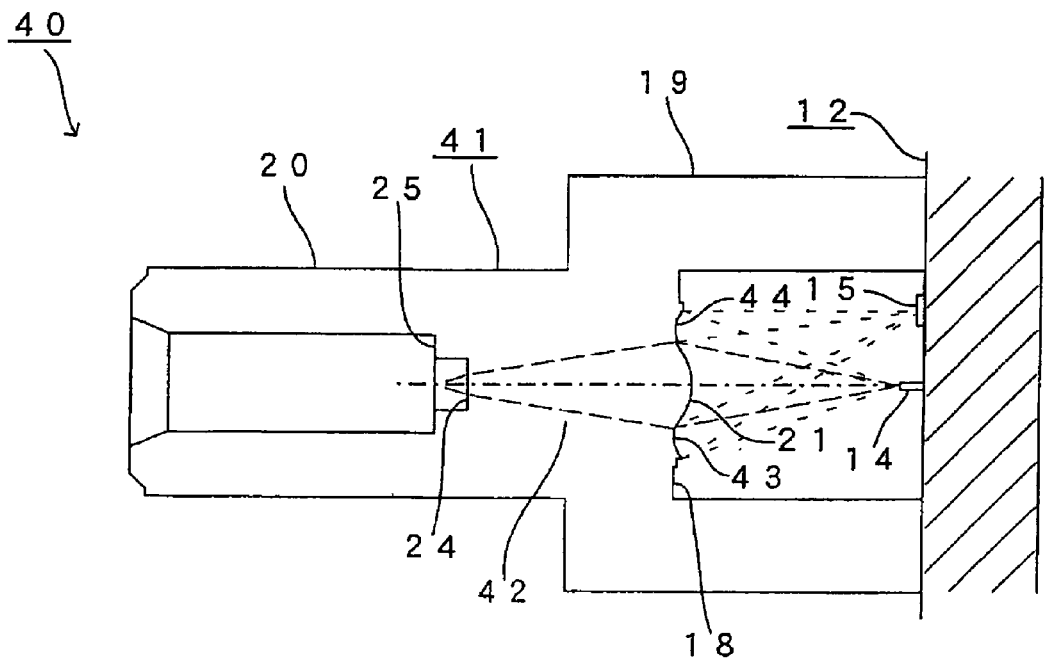
FIG. 6 is a schematic diagram of an optical module according to a third embodiment of an optical element, an optical module holder including the optical element, an optical module, and an optical connector of the present invention.

As shown in FIG. 6, an optical module 40 according to the embodiment includes an optical module holder 41 and a substrate-mounted photoelectric conversion element 12, as does the first embodiment and the second embodiment. The optical module holder 41 is formed by an optical element 42, the photoelectric conversion element holder 19, and the optical fiber attaching section 20 being integrally formed using resin material.

Figure 7:
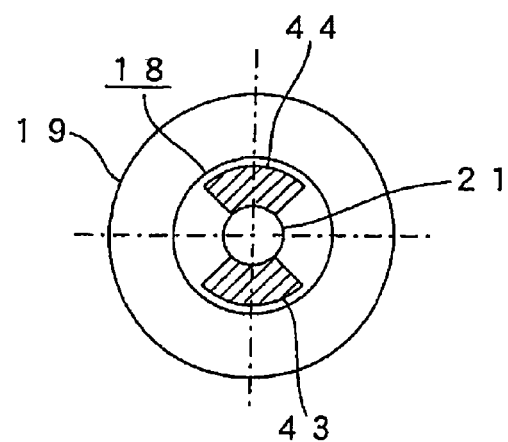
FIG. 7 is a diagram of the optical module according to the third embodiment of the optical element, the optical module holder including the optical element, the optical module, and the optical connector of the present invention, viewed from a photoelectric conversion element side.

Furthermore, the transmitting surface section 21 is formed on the entrance surface 18 of the optical element 42 as according to the first embodiment, as shown in FIG. 6 and FIG. 7. The transmitting surface section 21 is a convex lens surface.

However, according to the embodiment, the configuration of the reflective surface section differs from those according to the first embodiment and the second embodiment.

In other words, according to the embodiment, a flat, fan-shaped first reflective surface section 43 is formed on the entrance surface 18 in an outward radial direction to the transmitting surface section 21, such as to be connected with the transmitting surface section 21. The concave surface of the first reflective surface section 43 faces the photoelectric conversion element 12 side.

A flat, fan-shaped second reflective surface section 44 is formed on the entrance surface 18 in a position facing the first reflective surface section 43, with the transmitting surface section 21 there between, in an outward radial direction to the transmitting surface section 21, such as to be connected with the transmitting surface section 21. The concave surface of the second reflective surface section 44 faces the photoelectric conversion element 12 side.

Furthermore, the first reflective surface section 43 and the second reflective surface section are formed based on a mutually separate design such as to have a mutually different optical axis position or angle to the optical axis.

The first reflective surface section 43 and the second reflective surface section 44, formed as described above, each reflect the light emitted from the surface emitting laser 14 and incident on each of the reflective surface sections, 43 and 44, as according to the first embodiment and the second embodiment. As a result, the light incident on the surface emitting laser 14 can be concentrated on the monitor detector 15 in the photoelectric conversion element 12.

Therefore, according to this embodiment as well, as according to the first embodiment, even when the substrate-mounted photoelectric conversion element 12 on which the glass window 7 cannot be provided is used, the monitoring detector 15 can receive the monitor light using light reflection by the first reflective surface section 43 and the second reflective surface section 44.

According to the embodiment, as according to the first embodiment, the first reflective surface section 43 and the second reflective surface section 44 can be formed as mutually separate curved surfaces. Therefore, the shape of the reflective surface sections can be formed into curved surfaces more preferable for reflecting the monitor light.

As according to the first embodiment and the second embodiment, the first reflective surface section 43 and the second reflective surface section 44 are each structured to be a reflective surface using Fresnel reflection. As a variation example of the first reflective surface section 43 and the second reflective surface section 44, a reflective surface having a reflective structure composed of a microstructure can be used. The microstructure is a group of minute concave and convex forms. Alternatively, a reflective surface coated by a material (such as Al, Ag, or Cr) having favorable reflectance can be used.

Furthermore, the first reflective surface section 43 and the second reflective surface section 44 that are formed as mutually separate curved surfaces are not necessarily limited to two reflective surface sections as shown in FIG. 7.

Figure 8:
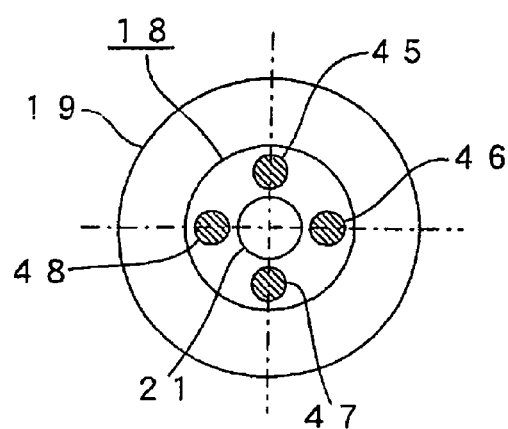
FIG. 8 is a diagram of a variation example of the optical element shown in FIG. 6 according to the third embodiment of an optical element, an optical module holder including the optical element, an optical module, and an optical connector of the present invention.
Figure 9:
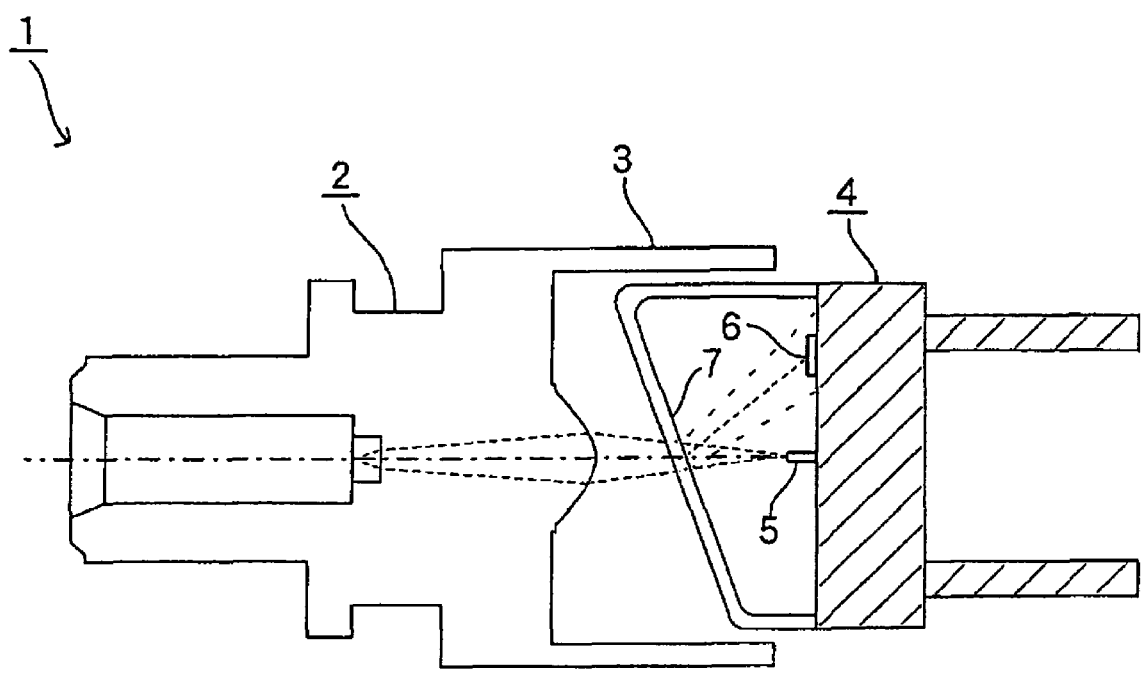
FIG. 9 is a diagram of an example of a conventional optical module.

For example, as shown in FIG. 8, four flat, circular reflective surface sections 45, 46, 47, and 48 can be formed outside of the transmitting surface section 21. The reflective surface sections 45, 46, 47, and 48 are formed such as to be evenly spaced in the circumferential direction. Each reflective surface section, 45, 46, 47, and 48, are mutually separate curved surfaces. As a result, the shape of the reflective surface section can be further optimized for reflecting the monitor light.

Moreover, the optical connector can be formed by the optical module holder 41 according to the embodiment being housed within the housing 27, as according to the first embodiment.

As described above, the present invention can support high-speed communication, achieve reductions in the number of components and cost, and enhance optical characteristics and manufacturability.

The present invention is not limited to the above-described embodiments. Various modifications can be made as required.

For example, according to the embodiments described above, the differential grating 24 is formed in the center of the end face of the optical element 17 on the optical fiber side. However, the configuration is not limited thereto. An aspherical lens surface including a free face or a plane that is optically coupled with the end face of the optical fiber can also be used.

What is claimed is:
1. An optical element comprising:
an optical module holder;
a transmitting surface section that refracts incident light emitted from a predetermined light-emitting position and transmits the light;
at least one reflective surface section that reflects the incident light emitted from the light emitting position such that the light returns to a position differing and spaced apart from the light emitting position, and wherein
an optical axis of the transmitting surface section and an optical axis of the reflective surface section are out of alignment in a radial direction so as to be mutually parallel;
the transmitting surface section and the reflective surface section are each integrally formed with an entrance surface of a main body of the optical module holder for the light emitted from the light emitting position;
said transmitting surface section is in a circular shape having a convex surface facing said light emitting position and having an optical axis aligned with a center axis of light emitted from said light emitting position; and
the reflective surface section surrounds said transmitting surface section and is connected thereto.

2. The optical element according to claim 1, wherein:
the transmitting surface section is formed in a center area of the entrance surface and the reflective surface section is formed in a peripheral area of the entrance surface surrounding said transmitting surface section.

3. The optical element according to claim 1, wherein:
a plurality of reflective surface sections are formed and optical axes of the plurality of reflective surface sections are out of alignment such as to be mutually parallel or mutually tilted.

4. The optical element according to claim 1, wherein:
the transmitting surface section is formed as an aspheric surface that transmits the incident light and concentrates the light; and
the reflective surface section is formed as an aspheric surface that reflects the incident light and concentrates the light.

5. The optical element according to claim 1, wherein the transmitting surface section and the reflective surface section are integrally formed from a same resin material.

6. An optical module holder comprising:
an optical element according to claim 1;
a light element attaching section formed on the light-emitting position side of the optical element and capable of being attached to a light element including a light-emitting element and a light-receiving element; and
an optical transmission line attaching section formed on a side opposite of the light-emitting position of the optical element and capable of being attached to an end face of an optical transmission line,
wherein, the optical element, the light element attaching section, and the optical transmission line attaching section are integrally formed by resin material.

7. An optical module comprising:
an optical module holder according to claim 6; and
a light element including a light-emitting element and a light-receiving element.

8. An optical connector comprising:
an optical module according to claim 7; and
a housing that houses the optical module.

9. The optical element according to claim 2, wherein said reflective surface section is substantially ring-shaped.

* * * * *